(12) United States Patent
Joseph et al.

(10) Patent No.: US 6,623,824 B1
(45) Date of Patent: *Sep. 23, 2003

(54) METHOD FOR MAKING A MICROREPLICATED ARTICLE USING A SUBSTRATE COMPRISING A SYNDIOTACTIC VINYL AROMATIC POLYMER

(75) Inventors: William D. Joseph, Maplewood, MN (US); Lee A. Pavelka, Cottage Grove, MN (US); Jaime R. Ojeda, Woodbury, MN (US); Denise A. Barrera, Oakdale, MN (US); Roberta E. Harelstad, Woodbury, MN (US); Bruce A. Sventek, St. Paul, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/240,521

(22) Filed: Jan. 29, 1999

(51) Int. Cl.$^7$ .................. C08L 25/00; B32B 9/00; B32B 9/06
(52) U.S. Cl. ............. 428/40.1; 428/41.8; 428/500; 524/577
(58) Field of Search ............... 524/577; 428/40.1, 428/41.8, 500

(56) References Cited

U.S. PATENT DOCUMENTS

| 3,684,348 A | 8/1972 | Rowland | 350/150 |
| 3,712,706 A | 1/1973 | Stamm | 350/103 |
| 3,712,716 A | 1/1973 | Cornsweet et al. | 351/7 |
| 3,810,804 A | 5/1974 | Rowland | 156/245 |
| 3,817,596 A | 6/1974 | Tanaka | 350/103 |
| 4,025,159 A | 5/1977 | McGrath | 350/105 |
| 4,244,683 A | 1/1981 | Rowland | 425/143 |

(List continued on next page.)

FOREIGN PATENT DOCUMENTS

| EP | 312 976 | 4/1989 | ........... C08L/25/02 |
| EP | 818 301 | 1/1996 | ........... B29C/59/04 |
| EP | 796 716 | 9/1997 | |
| JP | 62-187708 | 8/1987 | ........... C08F/12/08 |
| WO | WO/96/30786 | 2/1996 | ........... G02B/5/124 |
| WO | WO 98/29516 | 7/1998 | ............... C09J/7/02 |
| WO | WO 98/54236 | 12/1998 | ......... C08F/212/08 |

OTHER PUBLICATIONS

"Interpenetrating Polymer Networks and Related Materials" by L. H. Sperling, Lehigh University, Plenum Press, New York 1981.
Journal of the Chemical Society (London, 1970), No 16, P930 Helling et al.
"Plastics Additives Handbook" 3$^{rd}$ Edition, by Gachter et al., Hanser Publishers, New York, pp. 189–195, 1990, Copyright Carl Hanser Verlag Munchen Wien 1990.
"The Current Status of Interpenetrating Polymer Networks" by L.H. Sperling and V. Mishra, *Polymers for Advanced Technologies*, vol. 7 No. 4, 197–208 (Apr. 1996).
"Interpenetrating Polymer Networks" edited by D. Klempner et al., Advances in Chemistry Series #239, 3–38, (1994).
"Encyclopedia of Polymer Science and Engineering" p. 279, vol. 8 (John Wiley & Sons, New York, 1981.

*Primary Examiner*—Peter D. Mulcahy
(74) *Attorney, Agent, or Firm*—John A. Fortkort; Stephen C. Jensen

(57) ABSTRACT

A novel release liner is provided which has a release surface comprising a syndiotactic polymer. The release liners of the present invention offer superior release to a wide variety of materials without the application of release agents, have relatively high heat distortion temperatures, and are unaffected by radiation sources used to cure most polymeric compositions. The release liners of the present invention can be microreplicated with a pattern which can be transferred to coatings and other impressionable materials to impart unique physical or optical properties. Thus, a method of producing a patterned article is also provided, as is a method of producing a solid object from a curable composition.

26 Claims, 2 Drawing Sheets

U.S. PATENT DOCUMENTS

| | | | |
|---|---|---|---|
| 4,332,847 A | 6/1982 | Rowland | 428/156 |
| 4,486,363 A | 12/1984 | Pricone et al. | 264/1.4 |
| 4,588,258 A | 5/1986 | Hoopman | 350/103 |
| 4,601,861 A | 7/1986 | Pricone et al. | 264/1.6 |
| 4,775,219 A | 10/1988 | Appeldorn et al. | 350/103 |
| 4,895,428 A | 1/1990 | Nelson et al. | 350/103 |
| 5,082,717 A | 1/1992 | Yaguchi et al. | 428/207 |
| 5,127,158 A | 7/1992 | Nakano | 29/849 |
| 5,138,488 A | 8/1992 | Szczech | 359/529 |
| 5,145,950 A | 9/1992 | Funaki et al. | 528/481 |
| 5,166,238 A | 11/1992 | Nakano et al. | 524/120 |
| 5,188,930 A | 2/1993 | Funaki et al. | 430/536 |
| 5,219,940 A | 6/1993 | Nakano | 525/133 |
| 5,273,830 A | 12/1993 | Yaguchi et al. | 428/523 |
| 5,318,839 A | 6/1994 | Arai et al. | 428/329 |
| 5,346,950 A | 9/1994 | Negi et al. | 525/57 |
| 5,476,899 A | 12/1995 | Funaki et al. | 524/577 |
| 5,496,919 A | 3/1996 | Nakano | 528/481 |
| 5,706,132 A | 1/1998 | Nestegard et al. | 359/529 |
| 5,851,617 A * | 12/1998 | Keiser | 428/41.8 |
| 6,326,072 B1 * | 12/2001 | Ojeda et al. | 428/40.1 |

\* cited by examiner

METHOD FOR MAKING A MICROREPLICATED ARTICLE USING A SUBSTRATE COMPRISING A SYNDIOTACTIC VINYL AROMATIC POLYMER

FIELD OF THE INVENTION

The present invention pertains to release liners, and more specifically to release liners comprising a syndiotactic vinyl aromatic polymer. The present invention also pertains to the use of such release liners to make a wide variety of articles having a patterned surface.

BACKGROUND OF THE INVENTION

Release liners are used extensively in industry for a variety of purposes, including providing mechanical strength and support to manufactured articles, protecting manufactured articles during transportation and storage, and providing release properties to the manufactured article (when it is desired to withdraw the supported manufactured article from the release liners). For example, release liners are used in the transportation and storage of self-sticking floor tile to protect the adhesive surface that is present on these products until the point of use, at which time the release liner is easily removed and discarded.

Release liners may also be used as industrial tooling to manufacture articles from curable compositions. For example, a curable composition can be coated onto a release liner and cured, and then the resultant cured product can be subsequently removed for further processing, use, and/or distribution. If the release liner has a surface texture, the texture can be imparted to the cured article. Such products can be formed from compositions that may be cured using chemical crosslinking techniques, radiation cross-linking techniques, and the like. Radiation curable compositions are particularly useful in that such compositions can be coated and thereafter quickly cured, resulting in fast cycle times.

Various materials have been used to manufacture release liners. For example, release liners comprising polypropylene, polyethylene, polyesters, silicone rubbers, and various copolymers of these materials are well known in the art. Release liners of fluorinated polymers such as polytetrafluoroethylene are also known. However, many of these materials, such as polyethylene, polypropylene, and polyester, have relatively low heat distortion temperatures or lose their release properties at elevated temperatures. Consequently, these materials are limited to low temperature applications, e.g., temperatures below about 85° C.

Furthermore, many of these materials require the use of a release agent to be generally incorporated into, or coated onto, the release liner in order for the liner to have the desired release properties. The use of a release agent, however, complicates the manufacturing process and can lead to the introduction of impurities into the finished product, sometimes with an accompanying reduction in desirable physical properties.

Additionally, many commercially available release liners are not amenable to use in processes in which materials supported upon the release liner are to be cured using radiation curing techniques, as through exposure to ultraviolet or electron beam radiation sources. Thus, some polymers used in conventional release liners lose their release characteristics or undergo physical distortions when irradiated with ultraviolet or electron beam radiation. For example, when release liners comprising silicone rubber are exposed to e-beam radiation, the e-beam radiation induces grafting and other chemical reactions in the release liner that causes the liner to bind to an article supported on its surface.

Other release liners absorb so much of the incident radiation that it is not feasible to cure materials supported upon the liner by irradiation through the release liner. Such through-curing is desirable in applications such as adhesive synthesis, adhesive cross-linking, radiation cure replication, or in situations where the material to be cured is sandwiched between two release liners.

Many prior art release liners are currently manufactured from fluorinated polymers such as polytetrafluoroethylene (commercially available under the tradename "Teflon" from E.I. duPont de Nemours and Company). While these release liners exhibit good release properties toward a variety of materials, they are too expensive to be economically feasible in many applications, as where the release liner will be disposed after a single use.

Many of the prior art release liners are also incompatible with the materials and compositions of interest in adhesive and microreplication applications. Specifically, many release liners exhibit large surface energy differences with low viscosity, molten, polymeric admixtures, causing them to suffer from problems such as dewetting during coating operations. In such cases, the molten admixture may tend to "bead up" on the surface of the release liner, instead of forming a uniform coating as desired. On the other hand, many materials on which a uniform coating may be readily formed do not provide the desired release properties.

There is thus a need in the art for a release liner which has low surface energy properties, is resistant to heat distortion at high temperatures, is compatible with radiation curing techniques, allows through-curing of radiation-curable compositions, and is relatively inexpensive. There is also a need in the art for a release liner which provides good release properties without exhibiting dewetting problems with respect to a molten admixture (e.g., a release liner which exhibits desirable release properties with respect to the finished article, but which exhibits good wet-out with respect to the molten admixture).

Another problem with many prior art release liners is their inability to provide good release properties to Interpenetrating Polymer Networks (IPNs). IPNs are networks of two or more polymers that are formed by independent polymerization of two or more monomers in the presence of each other so that the resulting independent crosslinked polymer networks are physically intertwined but are essentially free of chemical bonds between them (that is, there is produced an entangled combination of two crosslinked polymers that are not chemically bonded to each other). Some of the more important IPNs include simultaneous IPNs, sequential IPNs, gradient IPNs, latex IPNs, thermoplastic IPNs, and semi-IPNs.

These and other types of IPNs, their physical properties (e.g., phase diagrams), and methods for their preparation and characterization, are described, for example, in L. H. Sperling and V. Mishra, "Current Status of Interpenetrating Polymer Networks", *Polymers for Advanced Technologies*, Vol. 7, No. 4, 197–208 (April 1996), L. H. Sperling, "Interpenetrating Polymer Networks: An Overview", *Interpenetrating Polymer Networks*, edited by D. Klempner, L. H. Sperling, and L. A. Utracki, Advances in Chemistry Series #239, 3–38, (1994), "Encyclopedia of Polymer Science and Engineering", p. 279, Vol. 8 (John Wiley & Sons, New York, 1984), and in L. H. Sperling, "Interpenetrating Polymer Networks and Related Materials," (Plenum Press, New York, 1981).

Due to their unique molecular structures, IPNs possess a number of very desirable physical properties. However, most prior art release liners exhibit very poor release properties with respect to IPNs, particularly some of the more desirable IPNs such as urethane acrylate IPNs. As a result, it is often difficult to make articles having a structured (e.g., microreplicated) surface from IPNs, nor is there a convenient method for making articles from IPNs that can be releasably coupled to a release liner. There is thus a need in the art for a release liner that provides good release properties for IPNs such as urethane acrylate IPNs, and that can be used to impart a structured or patterned surface to such IPNs.

These and other needs are met by the present invention, as hereinafter described.

SUMMARY OF THE INVENTION

The present invention is a release liner comprising a syndiotactic vinyl aromatic polymer, and the use of such a release liner to make an article having a patterned surface.

In one aspect, the present invention relates to a release liner having a supporting surface, wherein the release liner comprises a sufficient amount of a syndiotactic vinyl aromatic polymer having a sufficient amount of syndiotacticity that the article can be releasably coupled to the release liner.

In another aspect, the present invention relates to an assembly comprising a release liner comprising a syndiotactic vinyl aromatic polymer and an article releasably disposed upon said release liner.

In still another aspect, the present invention relates to a method for producing a patterned article. A release liner comprising a syndiotactic vinyl aromatic polymer is provided which has a patterned surface. A composition is disposed on the release liner in such a manner that the pattern on the release liner is imparted to the composition, thereby resulting in a patterned article. The article is then removed from the release liner in such a way that the pattern is substantially retained on the surface of the article.

In still another aspect, the present invention relates to a method for producing a solid object from a curable composition. A radiation source is provided, along with a release liner comprising a syndiotactic vinyl aromatic polymer which is sufficiently transparent to the radiation produced by the radiation source to allow a radiation curable composition to be cured by irradiating through the release liner. The radiation curable composition is then coated onto the release liner and is exposed to a sufficient amount of the radiation until the composition is sufficiently cured to allow it to be removed from the release liner as a substantially solid mass.

In yet another aspect, the present invention relates to a method for making articles having a patterned surface from IPNs such as urethane acrylate IPNs, and to articles so made. In accordance with the method, a release liner comprising a syndiotactic vinyl aromatic polymer is provided which has a patterned surface. A composition comprising an IPN is disposed on the release liner in such a manner that the pattern on the release liner is imparted to the composition, thereby resulting in a patterned article. The article is then removed from the release liner in such a way that the pattern is substantially retained on the surface of the article.

In still another aspect, the present invention relates to an assembly comprising (a) a release liner comprising a syndiotactic vinyl aromatic polymer, and (b) an article comprising an IPN which is releasably disposed upon said release liner.

Figure 1:
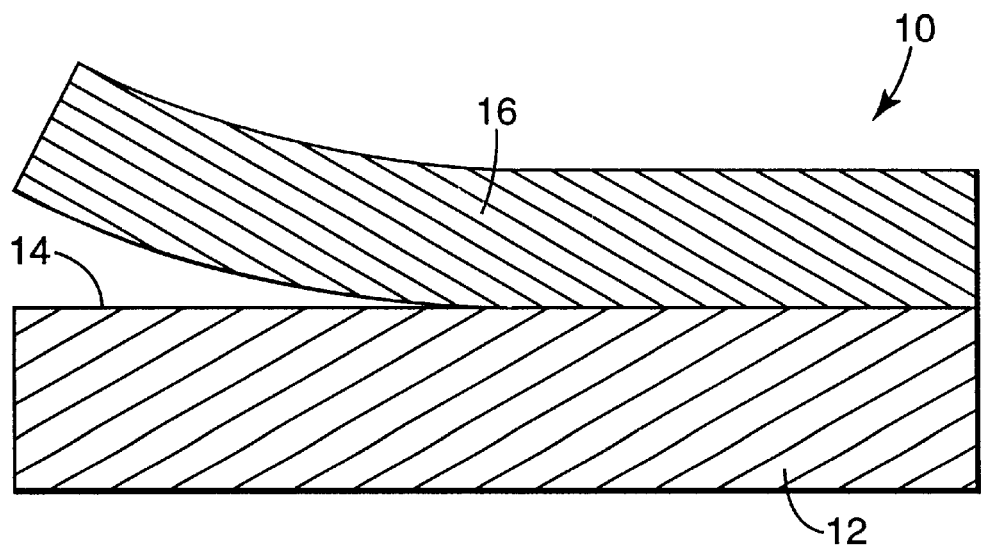
FIG. 1 is a side view shown in cross-section of an assembly including a release liner of the present invention and an article releasably supported upon the release liner.

It should be understood that the invention is not limited to the particular embodiments exemplified in the Drawings, nor those disclosed in the following Detailed Description. On the contrary, the intention is to cover all modifications, equivalents, and alternatives falling within the spirit and scope of the invention as defined by the appended claims. The embodiments are chosen and described so that others skilled in the art may appreciate and understand the principles and practices of the present invention.

DETAILED DESCRIPTION OF THE PREFERRED EMBODIMENTS

Recent developments in catalysis technology have enabled the synthesis of vinyl aromatic polymers, such as polystyrene, that comprise chain segments having a so-called "syndiotactic" configuration. Syndiotacticity refers to one pattern by which vinyl monomers may be added to a growing polymer chain when one of the carbon atoms involved in the monomer's double bond carries two different substituents. Polymerization of such monomers in head-to-tail fashion yields a polymer chain in which every other carbon atom of the backbone is a site of steric isomerism. Such carbon atoms are referred to as "pseudoasymmetric" or "chiral" carbon atoms. Each pseudoasymmetric carbon atom can exist in one of two distinguishable configurations. Depending upon the configuration of such carbon atoms when the corresponding vinyl monomers are added to a growing polymer chain, the resultant chain can be atactic, isotactic, or syndiotactic.

For example, consider a pseudosymmetric carbon atom of a head-to-tail backbone that carries the substituents X and Y. If the polymer backbone is oriented so that the bonds between the main chain carbon atoms form a planar zigzag pattern, then each X and Y substituent will lie either above or below the plane defined by said backbone. If all X substituents lie to one side of the backbone while all Y substituents lie to the other side, then the polymer chain is said to have an isotactic configuration. If the X and Y substituents are randomly distributed above and below the backbone, then the polymer chain is said to have an atactic configuration. If the X and Y substituents appear alternately above and below the backbone, the polymer is said to have a syndiotactic configuration. In other words, the side groups of a syndiotactic polymer chain are arranged in a symmetrical and recurring fashion above and below the backbone when the backbone is arranged so as to lie in a single plane. For example, in the case of syndiotactic polystyrene, phenyl groups (the side groups), are conFIG.d alternately above and below the plane defined by the zigzag pattern of the fully extended carbon-carbon main chain. Syndiotacticity is described in Rudin, "The Elements of Polymer Science and Engineering", Academic Press, pages 128–132 (1982).

Syndiotactic vinyl aromatic polymers have been used to make various articles that exhibit good dimensional stability, thermal stability, and/or moisture resistance. The use of syndiotactic polystyrene in overlay films, for example, has been described in Assignee's copending application U.S. Ser. No. 08/761,912, filed Dec. 9, 1996, having Attorney's Docket No. 53059USA8A. The use of syndiotactic vinyl aromatic polymers in retroreflective film or sheeting, specifically microreplicated cube-corner (microprismatic) retroreflective film and sheeting, and the use of such film or sheeting in signing applications, has been described in Assignee's copending application, having Attorney's Docket No. 53984USA7A, filed on even date with the present application, and incorporated herein by reference.

Syndiotactic vinyl aromatic polymers and methods of making these polymers have been described in U.S. Pat. Nos. 5,496,919 (Nakano); 5,188,930 (Funaki et al.); 5,476,899 (Funaki et al.); 5,389,431 (Yamasaki); 5,346,950 (Negi et al.); 5,318,839 (Arai et al.); 5,273,830 (Yaguchi et al.); 5,219,940 (Nakano); 5,166,238 (Nakano et al.); 5,145,950 (Funaki et al.); 5,127,158 (Nakano); and 5,082,717 (Yaguchi et al.). See also Japanese Patent Application Laid-Open No. 187708/1987.

The present invention relates to release liners comprising a syndiotactic vinyl aromatic polymer. In particularly preferred embodiments, the syndiotactic vinyl aromatic polymer comprises at least 80% by weight, and preferably at least 90% by weight, of syndiotactic polystyrene chain segments. Syndiotactic vinyl aromatic polymers.have several properties that make them extremely well-suited for making release liners. Specifically, sPS has an inherently low surface energy of about 29.4 dynes/cm. Thus, release liners incorporating these polymers offer excellent release properties toward a variety of different substances without requiring the use of release agents. The release liners of the present invention are also compatible with the materials commonly of interest in adhesive and microreplication applications, and are easily wetted by such materials during coating operations.

Additionally, the release liners of the present invention possess relatively high heat distortion temperatures, making them.particularly suitable for applications requiring thermal processing. In particular, the release liners of the present invention maintain both dimensional integrity and release properties at temperatures well in excess of 100° C., and even up to about 240° C., allowing them to be used with thermally curable materials whose processing temperatures are too high for polyethylene, polypropylene, and polyester release liners. Furthermore, the release liners of the present invention provide much better wet-out properties, and are significantly less expensive, than polytetrafluoroethylene release liners, making them inexpensive enough to be discarded after a single use, yet durable enough for multiple uses.

The release liners of the present invention also maintain dimensional integrity and release properties when irradiated with electron beam or ultraviolet radiation at the levels typically required for polymer processing, thus allowing radiation-curable materials to be cured while they are supported on the release liner. After curing, the resultant cured articles can be easily removed from the liners. Furthermore, because the syndiotactic polymers used in the release liners of the present invention are transparent to ultraviolet radiation down to wavelengths as short as 305 nm, it is possible to cure radiation-curable compositions through the release liner. Such through-curing is particularly advantageous in applications such as microreplication, adhesive synthesis, and adhesive cross-linking, or where the curable composition is enclosed in part or in whole by the release liner or is sandwiched between two release liners.

The release liners of the present invention can be formed with a pattern, such as a microreplicated texture, that can be transferred to articles formed on the release liner. This allows the release liners to be used as tooling for forming articles having unique physical and/or optical properties.

FIG. 1 illustrates an assembly 10 including a release liner 12 of the present invention having a smooth release surface 14 that releasably supports an article 16. The article is shown in FIG. 1 in the process of being removed from the release liner.

Generally, the release liner comprises a sufficient amount of a syndiotactic vinyl aromatic polymer having a sufficient amount of syndiotacticity such that the article can be releasably coupled to the release liner. Representative syndiotactic vinyl aromatic polymers suitable for use in the present invention include, but are not limited to, the syndiotactic varieties of poly(styrene), poly(alkyl styrene)s, poly (aryl styrene)s, poly(styrene halide)s, poly(alkoxy styrene)s, poly (vinyl ester benzoate), poly(vinyl naphthalene), poly (vinylstyrene), and poly(acenaphthalene), as well as the hydrogenated polymers and mixtures or copolymers containing these structural units. Examples of poly(alkyl styrene)s include the isomers of the following: poly (methylstyrene), poly(ethylstyrene), poly(propylstyrene), and poly(butylstyrene). Examples of poly(aryl styrene)s include the isomers of poly(phenylstyrene). As for the poly(styrene halide)s, examples include the isomers of the following: poly(chlorostyrene), poly(bromostyrene), and poly(fluorostyrene). Examples of poly(alkoxy styrene)s include the isomers of the following: poly(methoxystyrene) and poly(ethoxystyrene). Among these examples, preferable styrene group polymers, are: polystyrene, poly(p-methyl styrene), poly(m-methyl styrene), poly(p-tertiary butyl styrene), poly(p-chlorostyrene), poly(m-chlorostyrene), poly(p-fluorostyrene), and copolymers of styrene and p-methylstyrene. Of these polymers, polystyrene, poly(p-fluorostyrene), poly(p-methylstyrene) and copolymers of styrene and p-methylstyrene are most preferred.

Syndiotacticity can be qualitatively and quantitatively determined by NMR analysis using the carbon isotope method ($^{13}$C-NMR). The tacticity as determined by the $^{13}$C-NMR method can be indicated in terms of either the weight percent of a polymer which has a syndiotactic configuration or in terms of the proportions of structural units (diads and pentads) continuously connected to each other in the syndiotactic configuration. In terms of the first approach, preferred syndiotactic polymers of the invention include at least about 20%, preferably at least about 30%, more preferably at least about 85%, and most preferably at least about 95%, by weight of syndiotactic chain segments. In terms of the second approach, preferred syndiotactic polymers have a syndiotacticity such that the proportion of the racemic diad is at least about 75%, and preferably at least about 85%, and the proportion of racemic pentad is at least about 30%, and preferably at least about 50%.

In some cases, the syndiotactic vinyl aromatic polymer may be grafted, copolymerized, or blended with various other monomeric or polymeric species to impart desired properties to the release liner. For example, the release liner may comprise a polymer blend of a syndiotactic vinyl aromatic polymer and optionally, other kinds of syndiotactic and/or nonsyndiotactic polymers. Such other kinds of polymers include polyolefins such as polyethylene, polypropylene, polybutene, or polypentene; polyesters such as polyethylene terephthalate, polybutylene terephthalate, or polyethylene naphthalate; polyamides, polythioethers, polysulfones, polyurethanes, polyethersulfones, polyimides, halogenated vinyl polymers such as those sold under the tradename TEFLON™, and combinations of these. For polymer blends, preferably 0.01 to 50 parts by weight of other kinds of polymer(s) may be used per 100 parts by weight of syndiotactic vinyl aromatic polymer(s). In some embodiments, a syndiotactic polystyrene may be blended with varying amounts of isotactic or atactic polystyrene.

While one preferred syndiotactic polystyrene polymer used in the present invention may be derived substantially entirely from unsubstituted styrene monomer, varying amounts of other copolymerizable monomers, some of which may contain alkyl, aryl, and other substituents, may also be incorporated into the polymer. For example, a preferred syndiotactic polystyrenic copolymer may be derived from monomers comprising about 100 parts by weight of styrene monomer and up to about 20 parts by weight of one or more other copolymerizable monomers, which may or may not possess pseudoasymmetry. Representative examples of such other monomers, in addition to the monomers for the homopolymers listed above in defining the syndiotactic vinyl aromatic polymer group, include olefin monomers, such as ethylene, propylene, butenes, pentenes, hexenes, octenes, and decenes; diene monomers such as butadiene and isoprene; cyclic olefin monomers; cyclic diene monomers; and polar vinyl monomers, such as methyl methacrylate, maleic anhydride, and acrylonitrile.

A particularly preferred syndiotactic polystyrenic copolymer is derived from 100 parts by weight styrene and 1 to 10, preferably 4 to 5, parts by weight paramethylstyrene. Incorporating such amounts of paramethylstyrene monomer into the polystyrene copolymer has been found to improve the clarity of the resulting release liner. One example of a particularly preferred vinyl aromatic, syndiotactic polystyrenic polymer, derived from 100 parts by weight styrene and 4 parts by weight of paramethylstyrene, is commercially available from the Dow Chemical Company under the trade designation QUESTRA™.

In many applications, the molecular weight of the vinyl aromatic, syndiotactic polymer utilized in the release liner of the present invention is not critical. Polymers having molecular weights within a wide range may be used with beneficial results. Generally, the weight average molecular weight $M_w$) may be at least 10,000, preferably 50,000 to 3,000,000, and more preferably 50,000 to about 400,000. Likewise, the molecular weight distribution is also not critical in many applications, and may be narrow or broad. For example, the ratio of $M_w:M_n$ may be 1.0 to 10, wherein $M_n$ is the average molecular weight.

The release liner of the present invention may optionally comprise one or more additives to enhance the physical properties of the release liner. For example, the release liner may comprise colorants, inorganic fillers, ultraviolet ("UV") absorbers, light stabilizers, free radical scavengers, antioxidants, anti-static agents, processing aids such as antiblocking agents, lubricants, cross-linking agents, other additives and combinations thereof. Colorants typically are added at about 0.01 to 30 weight percent, based upon 100 parts by weight of the syndiotactic polymer.

Most polymeric films which are to be used in signing and other outdoor applications are stabilized against UV degradation by compounding the base resin with UV absorbing (UVA) additives and/or other compounds that act as excited state quenchers, hydroperoxide decomposers, or free radical scavengers. Hidered-amine light stabilizers (HALS) have been found to be particularly good radical scavengers. UVA additives act by absorbing radiation in the UV region of the spectrum. HALS, on the other hand, behave by quenching radicals generated within the polymer matrix during exposure to UV radiation. A review of the types of materials used to improve UV stability may be.found in R. Gachter, H. Muller, and P. Klemchuk (Editors), "Plastics Additives Handbook", pp. 194–95 (3rd Ed., published by Hanser Publishers, New York).

UV absorbers typically are added at about 0.5 to 2.0 weight percent based upon 100 parts by weight of the syndiotactic polymer. Illustrative examples of suitable UV absorbers include derivatives of benzotriazole such as TINUVIN™ 327, 328, 900, and 1130, and TINUVIN-P™, all available commercially from Ciba-Geigy Corporation, Ardsley, N.Y.; chemical derivatives of benzophenone such as UVINUL™ M40, 408, and D-50, available commercially from BASF Corporation, Clifton, N.J.; SYNTASE™ 230, 800, and 1200, available commercially from Neville-Synthese Organics, Inc., Pittsburgh, Penn.; chemical derivatives of diphenylacrylate such as UVINUL™ N35 and 3039, available commercially from BASF Corporation, Clifton, N.J.; oxanilides such as Sanduvor VSU, available from Sandoz Corp.; triazines such as Cyasorb UV 1164, available from Cytac Industries; and salicylate derivatives.

Light stabilizers that may be used include hindered amines, which are typically used at about 0.5 to 2.0 percent by weight, based upon 100 parts by weight of the syndiotactic polymer. Examples of hindered amine light stabilizers include TINUVIN™ 144, 292, 622, and 770, and CHIMASSORB™ 944, all available from the Ciba-Geigy Corp., Ardsley, N.Y., and 2,2,6,6-tetraalkyl piperidine compounds. Free radical scavengers may also be used, typically at about 0.01 to 0.5 weight percent, based upon 100 parts by weight of the syndiotactic polymer.

Suitable antioxidants include phosphorous antioxidants, including monophosphites and diphosphites, and phenolic antioxidants. Suitable monophosphites for use in the release liner of the present invention include, but are not limited to, tris(2,4-tert-butyl-phenyl)phosphite) and tris(mono- or di-nonylphenyl)phosphite. Diphosphite antioxidants suitable for use in the present invention include, but are not limited to, distearylpentaerythritol diphosphite and dioctylpentaerythritol diphosphite. Representative examples of phenolic antioxidants include 2,6-ditertbutyl4-methylphenol, 2,6-diphenyl-4-methoxyphenol and 2,2-methylenbis(6-tertbutyl-4-methylphenol). Other antioxidants suitable for use in the present invention include hindered phenolic resins such as IRGANOX™ 1010, 1076, 1035, 1425, or MD-1024, or IRGAFOS™ 168, commercially available from the Ciba-Geigy Corp., Ardsley, N.Y.

In a preferred embodiment, the release liner contains an amount of the IRGANOX 1425 antioxidant effective to enhance the clarity of the release liner. This antioxidant has a melting point of about 260° C., which is approximately the same as the meltirg point of a syndiotactic polystyrene polymer. This material is believed to enhance clarity by reducing the rate of crystallinity of the syndiotactic polystyrene as the polymer solidifies from a molten state. Specifically, it is preferred that this antioxidant be present in an amount of from about 0.0001 to 2 parts by weight, more preferably, from about 0.001 to 1 parts by weight, and most preferably, from about 0.01 to 0.5 parts by weight per 100 parts by weight of the syndiotactic vinyl aromatic polymer.

Small amounts of other processing aids, typically no more than one part by weight per 100 parts by weight of the syndiotactic vinyl aromatic polymer, may be added to improve the polymer's processability. Useful processing aids include fatty acid esters, or fatty acid amides available from Glyco Inc., Norwalk, Conn., metallic stearates available from Henkel Corp., Hoboken, N.J., or WAX E™ available from Hoechst Celanese Corporation, Somerville, N.J.

If desired, the syndiotactic vinyl aromatic polymer may also contain substances such as flame retardants that optimize the overall properties of the resultant release liner.

Inorganic fillers suitable for use in the release liners of the present invention include, for example, oxides, hydroxides, sulfides, nitrides, halides, carbonates, acetates, phosphates, phosphites, organic carboxylates, silicates, titanates or borates of the group IA, IIA, IVA, VIA, VIIA, VIII, IB, IIB, IIIB or IVB elements, as well as hydrated compounds thereof. For example, suitable inorganic fillers comprising a group IA element include lithium fluoride and borax (the hydrate salt of sodium borate). Suitable inorganic fillers comprising a group IIA element include magnesium carbonate, magnesium phosphate, magnesium oxide and magnesium chloride. Other suitable inorganic fillers comprising the aforementioned group elements are disclosed in U.S. Pat. No. 5,188,930 (Funaki et al.).

The thickness of the release liner is not critical in most applications, and is usually determined by the intended use. The release liner should be thick enough to be durable, but yet thin enough so that syndiotactic polymer material is not wasted. Furthermore, in some applications, it will be desirable for the release liner to be flexible, and in these cases, the thickness of the liner will be dictated by the end use. Generally, the release liner may range from about 10 mils (0.25 mm) to about 30 mils (0.75 mm).

The release liners of the present invention may be used in the production of a solid object from a curable composition. In these applications, the release liner is coated with a fluid curable composition, and the curable composition is then cured to form an article using the appropriate curing technique. For example, if the curable composition is thermally curable, then the release liner and the composition supported on the release liner can be heated to achieve cure. If the composition is radiation curable, the composition can be irradiated to achieve cure. Because the release liner is transparent to ultraviolet light, irradiation with ultraviolet energy can occur through the release liner, if desired. As an alternative to the use of a fluid composition, a polymeric dry powder composition, which may be thermosetting or thermoplastic or radiation curable, can be coated onto the release liner, melted to form a coating, and then cured using a curing technique appropriate for the material.

Figure 2:
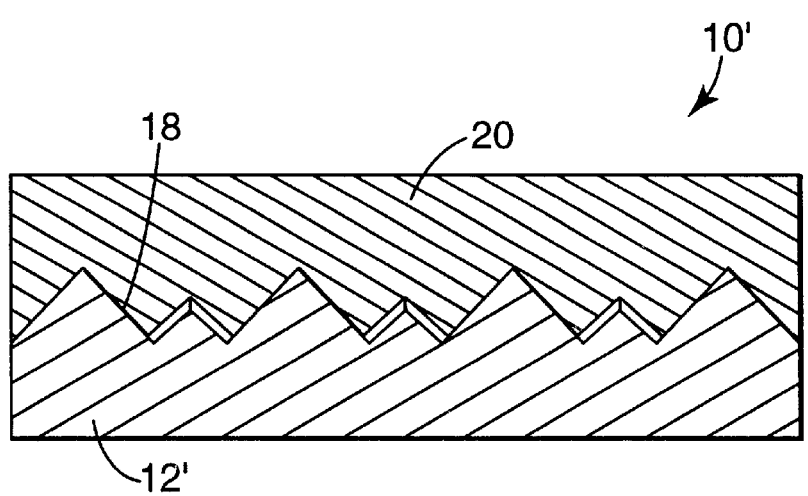
FIG. 2 is a side view shown in cross-section of an assembly including a release liner of the present invention which has a patterned surface, and an article releasably supported upon the release liner.

FIG. 2 illustrates another embodiment of the present invention in which an assembly 10' includes a release liner 12' identical to release liner 12 of FIG. 1, except that the release liner 12' has patterned release surface 18. The release liner 12' may be imparted with any desired pattern and, in this manner, can be utilized as a tool to produce patterned articles such as microreplicated films. Microreplicated films have a variety of uses in industry. For example, microreplicated plastic lenses are used in overhead projectors and in the screens of many laptop computers. Additionally, microreplicated films are used on many security badges, drivers licenses and identification cards, where their pattern makes it extremely difficult to counterfeit these types of identification. Finally, structured abrasives comprising microreplicated films offer superior performance for fine finishing of golf clubs, medical implants, and other metal products.

For purposes of illustration, the pattern formed on the release surface of release liner 12' is a microreplicated pattern corresponding to a cube corner retroreflective pattern. The pattern is imparted to retroreflective article 20 which was formed on the release liner. The retroreflective article can be easily removed from the release liner at any desired time. Retroreflective articles such as retroreflective sheeting have the property of redirecting incident light back towards its originating source in a substantially parallel path. These materials are thus typically employed in highway signs, street signs, pavement markings, and tape and patches for clothing where they provide critical visibility under poor lighting conditions.

There are essentially two types of retroreflective sheeting in widespread use today: microsphere-based sheeting and cube corner sheeting. Microsphere-based sheeting, sometimes referred to as beaded sheeting, is well known in the art and employs a multitude of microspheres, typically at least partially embedded in a binder layer and having associated specular or diffuse reflecting materials (e.g., pigment particles, metal flakes) to retroreflect light. Cube corner sheeting, on the other hand, typically employs a multitude of rigid, interconnected, cube corner elements to retroreflect incident light.

Cube corner retroreflectors typically comprise a sheet having a generally planar front surface and an array of cube corner elements protruding from the back surface. Cube corner reflecting elements comprise interconnected, generally trihedral structures, each of which has approximately mutually perpendicular lateral faces meeting to form a single corner, and thus are characterized as cube-corners. In use, the retroreflector is arranged with the front surface disposed generally toward the anticipated location of both incident light and intended observers. Light incident to the front surface enters the sheet, passes through the body of the sheet and is internally reflected by the faces of the elements so as to exit the front surface in a direction substantially toward the light source.This is referred to as retroreflection. The light rays are typically reflected at the cube faces due either to total internal reflection (TIR) from interfaces with an intentionally entrapped medium of greatly-different refractive index, such as air, or to reflective coatings, such as vapor deposited aluminum. Illustrative examples of cube corner type reflectors are disclosed in U.S. Pat. No. 3,684,348 (Rowland), U.S. Pat. No. 3,712,706 (Stamm), U.S. Pat. No. 3,810,804 (Rowland), U.S. Pat. No. 3,817,596 (Tanaka), U.S. Pat. No. 4,025,159 (McGrath), U.S. Pat. No. 4,576,850 (Martens), U.S. Pat. No. 4,588,258 (Hoopman), U.S. Pat. No. 4,775,219 (Appledorn et al.), U.S. Pat. No. 4,895,428 (Nelson et al.), U.S. Pat. No. 5,138,488 (Szczech), and U.S. Pat. No. 5,706,132 (Nestegard et al.).

Release liners of the present invention can be made in a variety of ways. In accordance with one approach, a suitable feed of the syndiotactic vinyl aromatic polymer, along with any other polymer(s) and/or monomer(s) and additives, is fed into an extruder, melted, and extruded into film form. The resultant film may then optionally be stretched in the machine and/or width directions while being annealed using a suitable heat source such as heated rolls, an oven, or an infrared heating unit.

Figure 3:
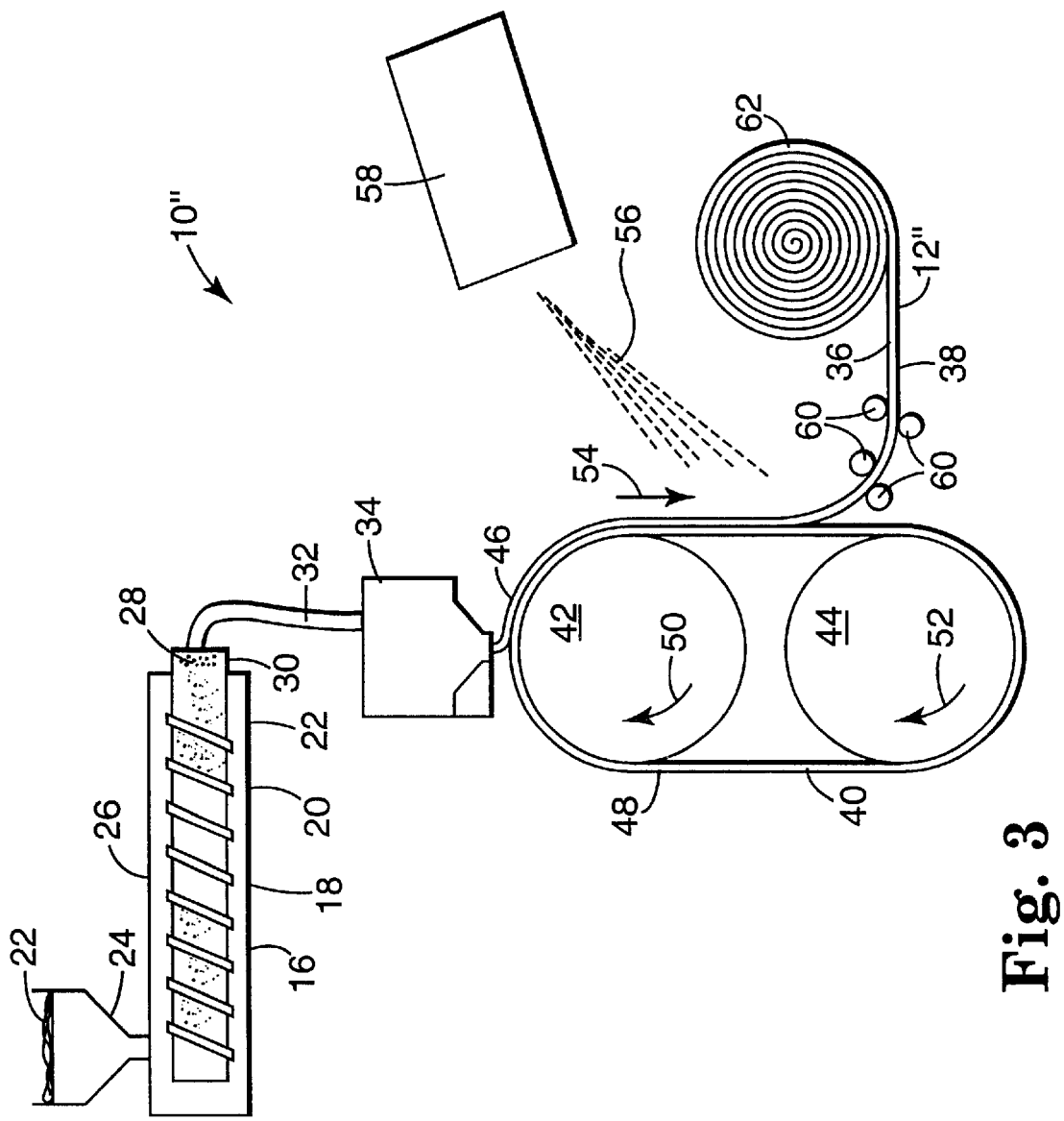
FIG. 3 is a schematic representation of one embodiment of a system suitable for manufacturing release liners of the present invention.

A particularly preferred approach for making a release liner with a patterned surface is shown schematically in FIG. 3. There, the release liner 12" is made in a continuous fashion using extrusion processing system 10". In a first step, the raw materials 22 to be incorporated into the release liner are loaded into a hopper 24. The raw materials include the syndiotactic polymer(s), nonsyndiotactic polymer(s), if any, and any other optional additives. Because the system incorporates an extruder 26, the polymeric components of the raw materials are preferably thermoplastic to facilitate processing, although thermosetting polymers could be used if desired. The polymer components of the raw materials are preferably supplied in pellet form to facilitate extrusion.

The raw materials are fed into the extruder from the hopper. The extruder may be any suitable extruder capable of melting the polymeric components of the raw materials, and may be, for example, a single screw extruder or a twin screw extruder. In one embodiment, a 32 mm, KL series, single screw, Killion extruder (Davis Standard Corp., Cedar Grove, N.J.) having four heating zones has been found to be suitable. The four heating zones may be set at any temperature(s) effective to melt the polymer components of the raw materials without degrading such components. For example, the four temperature zones are typically set at 520° F. (271° C.) (feed zone proximal to hopper, 16), 560° F. (293° C.), 580° F. (304° C.), and 580° F. (304° C.) (exit zone proximal to gate, 22), respectively, when processing the QUESTRA™ polymer. Such a temperature profile is commonly referred to in the art as a temperature ramp. The use of a temperature ramp, while not critical, helps to minimize sticking problems, avoiding back-up at the feed section of the extruder. During extrusion, the polymeric components are melted and thoroughly mixed with the other various ingredients of the raw materials, if any, to provide a substantially homogenous extrudate 28.

Extrudate exits the extruder at a gate 30 and is transported through a neck tube 32 to an extruder die 34. Under the illustrative operating conditions listed above at which the QUESTRA™ polymer is being processed, extrudate is typically at a temperature of about 596° F. (314° C.) as extrudate emerges from the gate. To facilitate extrusion, the die is typically heated to ensure that the extrudate is fluid and thermally homogeneous as it is transported through the die. When using the operating conditions listed above, 580° F. (304° C.) has been found to be a suitable die temperature.

The flow rate at which extrudate emerges from the die through a suitable die opening (not shown), and the rate at which the extrudate is "taken up" by downstream elements of the apparatus, can affect the thickness and haziness of the release liner. Generally, faster extrusion speeds and slower take-up speeds provide a thicker release liner, but faster extrusion or take-up speeds can increase haziness. Complicating such matters, extrudate thickness also tends to increase haziness, independent of the speeds. Balancing such concerns, the extruder is generally operated at a rate to ensure that extrudate emerges smoothly from the die opening while still providing a release liner with the desired thickness and clarity properties.

The extruder die may be provided with a die opening having a configuration corresponding to the desired general cross-sectional configuration of the release liner. For example, in preferred embodiments as shown in which the release liner is a film having first and second major opposed surfaces 36 and 38, respectively, the die opening is flat-film shaped.

The extrudate emerging from the die opening can be coated onto a moving belt 40 operatively supported upon first and second rotatable cans 42 and 44. The coated extrudate thereby provides a fluid coating 46 supported upon the outer surface 48 of the moving belt. If the belt is patterned, the pattern will be imparted to the resultant release liner. The cans each rotate in the directions indicated by arrows 50 and 52 to ensure that the moving belt transports fluid coating in the direction indicated by arrow 54. The first can is desirably maintained at an elevated temperature such that the polymer is retained well above its glass transition temperature (and its crystallization temperature, if any) to ensure adequate melt flow. For example, for a syndiotactic vinyl aromatic polymer having a melting temperature of about 260° C. such as the QUESTRA™ polymer, maintaining the first can at a temperature in the range from 204° C. to about 216° C. has been found to be suitable. The temperature of the second can may be controlled, if desired, but typically operates under ambient conditions and is preferably neither heated nor cooled during the operation of the system 10".

At least one of the cans is rotatably driven so that the moving belt has a linear speed preferably corresponding to the linear speed at which the extrudate leaves the die opening. Generally, the linear speed of the belt is 1 to 50 feet per minute.

While the extruded coating is supported upon the moving belt, the coating is quenched using a suitable cooling medium 56 supplied onto the coating by a cooling source 58. In preferred embodiments, the cooling medium is ambient air, and the cooling source is one or more blowers. Quenching causes the syndiotactic coating to solidify and thereby form a release liner 12". Quenching may occur at a variety of rates so long as the release liner is provided with the desired properties. For example, the quenching rate tends to affect the degree of crystallinity of the release liner. The degree of crystallinity, in turn, affects not only the optical clarity of the release liner, but also other characteristics such as heat resistance and durability. Generally, slower quenching rates provide the release liner with more crystallinity. This makes the release liner more hazy and brittle, yet more heat resistant. On the other hand, faster quenching rates provide the release liner with less crystallinity, making the release liner less brittle and more transparent to visible light (though transparency to UV radiation, which depends primarily on the chemical moieties in the release liner, is generally unaffected). Thus, if transparency and enhanced toughness are desired, faster quenching rates are preferred. On the other hand, if heat resistance is paramount, then slower quenching rates are preferred.

After quenching, the resultant release liner is guided off of the moving belt by a suitable mechanism such as guide rollers 60 where release liner may be processed into appropriate sizes and shapes or, as shown in FIG. 3, wound for storage as roll 62 for subsequent use and/or processing.

The following examples, while not intended to be limiting, illustrate various features of the present invention.

EXAMPLE 1

This Example demonstrates the production of an sPS film suitable for use in the present invention.

A film of syndiotactic polystyrene (sPS) was produced on a conventional polyester film orientation line having a 4.5" (11.43 cm) extruder equipped with a mixing screw. An sPS resin having a molecular weight of 275,000 and containing 4% para-methylstyrene (pMS) comonomer (QUESTRA™ polymer available from Dow Chemical Company, Midland, Mich.) was fed into the extruder. The extruder temperatures in zones 1–7 were 580° F. (304° C.), and the gate was maintained at 580° F. (304° C.). The extrudate was filtered and pumped through a necktube to a film die using a gear pump. The temperatures used were:

| | |
|---|---|
| filtration | 550° F. (288° C.); |
| gear pump | 630° F. (332° C.); |
| neck tube | 610° F. (321° C.); and |
| die | 620° F. (327° C.). |

Exiting the die, the sheet of polymer was formed into a cast web on a chilled casting wheel equipped with electrostatic pinning. The casting wheel was maintained at 150° F. (66° C.).

The cast web was then heated with infrared radiant heating to a stretching temperature of 240° F. (116° C.) and stretched in the machine, or length, direction (MD) on a series of idler rolls . The ratio of the MD stretch was about 3.0:1. The length stretched web was then stretched in the transverse, or width, direction (TD) using a film tenter operated with the stretch zone at a temperature of 240° F. (116° C.) and the heat set zone at a temperature of 470° F. (243° C.). The TD stretch ratio was about 3.3:1.

EXAMPLES 2–13

These Examples illustrates the cure of various acrylate formulations on an sPS release liner using a UV radiation source.

Each of Examples 2–13 were made using one or more of the monofunctional and multifunctional acrylate monomers listed in Table 1. The composition of each Example is shown in Table 2. The monomers of each Example were mixed with a high viscosity aliphatic urethane acrylate (CN 964, commercially available from Sartomer Co., Inc., Exton, Pa.) and a photoinitiator (DAROCUR™ 4265, commercially available from Ciba Geigy Corp., Tarrytown, N.Y.) to provide compositions which could be UV cured onto the sPS film of Example 1. The mixtures were coated onto the 4 mil (0.10 mm) syndiotactic polystyrene (sPS) release liner at a coating thickness of 4 mils (0.10 mm) and then cured for 10 minutes in a nitrogen purged UV chamber equipped with six 1.2 m Sylvania 350 BL 40 watt lights overhead, and another six below the film (12 total).

TABLE 1

Acrylate Monomers and Abbreviations

| Acrylate | Abbreviation |
| --- | --- |
| Trimethylol propane triacrylate | TMPTA |
| Ethoxy ethoxy ethyl acrylate | EEEA |
| Dipentaerythritol pentaacrylate | DPP |
| Ethoxylated trimethylol propane triacrylate | TMPEOTA |
| Tripropylene diacrylate | TRPGDA |
| Tetrahydrofurfuryl acrylate | THFA |
| Cyclohexyl acrylate | CHA |
| Tetraethylene diacrylate | TEGDA |
| Phenoxy ethyl acrylate | POEA |
| Caprolactone acrylate | CLA |
| Isobornyl acrylate | IBOA |
| Tetrahydrofurfuryl methacrylate | THFMA |
| Aliphatic Urethane Acrylate | CN 964 |

The adhesion of the cured coatings to the sPS was analyzed using a standard cross-hatch test, pursuant to which the coatings were slit in a cross-hatch pattern and laminated to a 2.54 cm wide piece of 3M SCOTCH™ brand 850 pressure sensitive adhesive tape. The tape was then removed by hand as fast as possible and the amount of cured coating remaining on the sPS was estimated and reported as a percent retained on sPS. The results of the test are reported in Table 2, where it is seen that the sPS release liner exhibited excellent release towards all of the materials.

TABLE 2

UV Cure Acrylate Formulations and Cross Hatch Adhesion Results

| Example | Weight Percent CN 964 | Acrylate Monomer | Weight Percent Acrylate Monomer | Weight Percent Darocur ™ 4265 | % Polymer Retained on sPS |
| --- | --- | --- | --- | --- | --- |
| 2 | 80% | TMPTA | 20% | 1% | 0% |
| 3 | 80% | EEEA | 20% | 1% | 1% |
| 4 | 80% | DPP | 20% | 1% | 0% |
| 5 | 80% | TMPEOTA | 20% | 1% | 0% |
| 6 | 80% | TRPGDA | 20% | 1% | 0% |
| 7 | 80% | THFA | 20% | 1% | 1% |
| 8 | 80% | CHA | 20% | 1% | 0% |
| 9 | 80% | TEGDA | 20% | 1% | 0% |
| 10 | 80% | POEA | 20% | 1% | 0% |
| 11 | 80% | CLA | 20% | 1% | 1% |
| 12 | 80% | IBOA | 20% | 1% | 0% |
| 13 | 80% | THFMA | 20% | 1% | 0% |

EXAMPLE 14

This Example illustrates the thermal cure of a urethane acrylate IPN formulation on an sPS release liner.

A urethane acrylate IPN formulation was prepared by combining a phenoxy ethyl acrylate (POEA, 13.63 g) solution containing a dissolved acrylate-functional yellow-green fluorescent dye (0.125 g) (Structure VII disclosed in Assignee's copending application U.S. Ser. No. 08/957,291, filed Oct. 24, 1997, having Attorney's Docket No. 53090USA2A); with a solution of POEA (3.00 g) containing dissolved PERKADOX™ 16 (0.35 g) (commercially available from Akzo Nobel Chemicals, Inc., Stanford, Conn.); a solution of caprolactone acrylate (1.00) containing 0.0075 g dibutyl tin dilaurate and 0.05 g of a defoamer (BYK™-066) (commercially available from Byk Chemie, Wallingford, Conn.); and a solution of SYNFAC™ 8024 (15.00 g) (commercially available from Milliken Chemical, Spartanburg, N.C.) containing 0.88 g of ethoxylated bisphenol A diacrylate (SR 346) (commercially available from Sartomer Co.), 0.38 g UVINUL™ N-3039 (commercially available from BASF Corp., Parsippany, N.J.), and 0.50 g TINUVIN™ 123 (commercially available from Ciba Geigy Corp., Tarrytown, N.Y.). The combined solution was mixed with a wooden spatula, treated with 17.49 g of DESMO-DUR™ N-3300 (commercially available from Bayer Chemicals, Pittsburgh, Pa.), agitated with an air mixer for 1 minute and degassed under vacuum (500 mm Hg) for 3 minutes. The degassed solution was knife coated between an sPS release liner (15.2 cm wide by 0.10 mm thick) and a 15.2 cm wide, 0.10 cm thick silicone-coated polyethylene terephthalate (PET) release liner (available commercially from Courtaulds Aerospace, Inc., Glendale, Calif.) at a thickness of 4 mils (0.10 mm), cured with a temperature ramp from 70° C. to 120° C. (at a ramp rate of 2.5° C./min), and postcured at 90° C. for 16–17 hours. When the three-layer structure was peeled apart, the IPN formulation separated readily from the sPS layer rather than from the silicone-coated PET layer after both the initial ramp cure and the final postcure. Since the IPN formulation releases quite easily from the silicone treated PET release liner when it is applied to that liner alone, this indicates that the sPS release liner provides very good release (better release than that afforded by the silicone-coated PET release liner).

EXAMPLE 15

This Example illustrates the thermal cure of a urethane acrylate IPN formulation on a structured sPS release liner.

A urethane acrylate IPN formulation was prepared by combining a phenoxy ethyl acrylate (POEA, 13.63 g) solution containing a dissolved acrylate-functional yellow-green fluorescent dye (0.125 g) (Structure VII disclosed in Assignee's copending application U.S. Ser. No. 08/957,291, filed Oct. 24, 1997, having Attorney's Docket No. 53090USA2A); with a solution of POEA (3.00 g) containing dissolved PERKADOX™ 16 (0.35 g); a solution of caprolactone acrylate (1.00 g) containing 0.0075 g dibutyl tin dilaurate and 0.05 g of a defoamer (BYK™-066); and a solution of SYNFAC™ 8024 (15.00 g) containing 0.88 g of ethoxylated bisphenol A diacrylate (SR 346), 0.38 g UVINUL™ N-3039, and 0.50 g TINUVIN™ 123. The combined solution was mixed with a spatula, treated with 17.49 g of DESMODUR™ N-3300, agitated with an air mixer for 1 minute and degassed under vacuum (500 mm Hg) for 3 minutes. The solution was knife coated between the textured side of a microreplicated sPS liner (15 cm wide by 0.10 mm thick) and a silicone-coated PET release liner (available commercially from Courtaulds Aerospace, Inc.) at a thickness of 0.10 mm, cured with a temperature ramp from 70° C. to 120° C. (at a ramp rate of 2.5° C./min), and postcured at 90° C. for 16–17 hours. The IPN formulation separated readily from the sPS layer rather than from the silicone-coated PET layer after both the initial ramp cure and the final postcure, indicating adhesion is greater to the silicone-coated PET release liner than to the microtextured sPS release liner.

EXAMPLE 16

Crosslinking of adhesives often improves the utility of the adhesive. For example, uncrosslinked adhesives on a release liner can flow when the release liner is stored in roll form, or split when unrolled. Crosslinked adhesives have a much lesser tendency to flow or split in this way. Crosslinks are formed by ionizing radiation in some materials. The crosslinks tie the polymer chains together giving the adhesive additional cohesive strength.

The performance of a syndiotactic polystyrene release liner (in Specimen 16A) in contact with a crosslinked adhesive was compared to that of a commercially available release liner (in Comparison Specimen 16B) of the type in which a paper substrate is impregnated with a clay/silicone release agent (Rubisil GS 138–632/DR, available from 4P Rube Grottingen GmbH, Gottingen, Germany). For each specimen, a sticky, crosslinkable, electron beam curable adhesive (90 parts by weight isooctyl acrylate and 10 parts by weight acrylic acid) was supplied as an intermediate layer between two conventional, silicone-type release liners. The top liner of this assembly was removed and replaced with the release liner to be tested. The resultant assembly was then irradiated with electron beam radiation through the top release liner (the liner being evaluated). The specimen was irradiated to a dose of 4 Mrads (40 kGy) at 250 kV with an Energy Sciences Inc (ESI) Model CB300 electron beam system. After irradiation, the specimen was conditioned at 70° F. and 50% relative humidity (RH) for 24 hours.

To test the release characteristics of the release liner, two 2.54 cm×20.3 cm strips were cut from the specimen. For each strip, the adhesive and top release liner were separated from the lower release liner and placed onto a glass plate. The remaining top release liner was attached to a "3M Slip/Peel Tester" (made by I-Mass Inc. Model #SP-101A) in order to determine the 180° peel value at a peel rate of 90 inches/min (229 cm/min). A transducer (model MB-05) was attached to the release liner in order to monitor the peel force during the test. The average peel value was recorded for each strip, and the final peel value reported for the specimen was determined as the average of the two strips' recorded peel values.

For purposes of comparison, an additional specimen incorporating each of the two release liners was prepared in which the adhesive was crosslinked before being placed into contact with the release liner. To do this, the adhesive was first placed onto a PET film material which was not release-coated. The adhesive was then irradiated from the exposed side (in the absence of a top liner) to 4 Mrads.(40 kGy), at 175 kV. The release liner was then placed on top of the crosslinked adhesive. The specimen was conditioned, cut and peel tested as above. The test results were as follows:

TABLE 3

| Specimen | 180° Peel at 229 cm/min (pre-crosslinked) | 180° Peel at 229 cm/min (crosslinked thru the liner) |
| --- | --- | --- |
| 16A | 94 g/cm | 284.5 g/cm |
| 16B (Comparison) | 91.5 g/cm | 221 g/cm |

These results show that the peel values of the syndiotactic polystyrene release liner (specimen 16A) is higher (which is less desirable) than that of the comparison specimen 16B, but both specimens nonetheless provide good release characteristics. However, the syndiotactic polystyrene release liner of the present invention has two big advantages over the comparison liner. Firstly, peel values for the comparison specimen were observed to increase over a 14-day time period. In contrast, the syndiotactic polystyrene release values were constant over time: Secondly, the comparison liner, being impregnated with silicone, will tend to transfer a small amount of silicone to the adhesive. This changes the adhesive properties and/or contaminates the adhesive surface. The syndiotactic polystyrene release liner has no such coating, and thus causes no such contamination.

EXAMPLE 17

The procedure of Example 16 was followed to compare performance, in contact with a crosslinked adhesive, of a release liner of the present invention against that of 5 comparison specimens, except that the adhesive was pre-polymerized to a syrupy consistency (about 15% conversion), and then cured and crosslinked with 4 Mrads (40 kGy) of electron beam radiation at 250 kV. The commercially available release liners (17B through 17F, respectively) used for comparison were Rubisil GS 138–632/DR (4P Rube Grottingen GmbH, Gottingen, Germany), Film #632 (Courtaulds Performance Films, Martinsville, Va.), Grade #13072 (Rexam Release, Oak Brook Ill.), 711/726 E-beam cured silicone release liner (Goldschmidt Chemical corp., Hopewell, Va.), and Grade #30ES1B (Eastern Fine Paper, Brewer, Me.). The results were as follows:

TABLE 4

| Specimen | Type | 180° Peel at 229 cm/min (pre-cure) | 180° Peel at 229 cm/min (cure thru the liner) |
| --- | --- | --- | --- |
| 17A | Syndiotactic polystyrene | 320 g/cm | 310 g/cm |
| 17B | Silicone/clay impregnated paper | 106.7 g/cm | 294.6 g/cm |

TABLE 4-continued

| Specimen | Type | 180° Peel at 229 cm/min (pre-cure) | 180° Peel at 229 cm/min (cure thru the liner) |
|---|---|---|---|
| 17C | PET film with silicone type coating | 23 g/cm | 68.6 g/cm |
| 17D | Paper coated with polymer/silicone | 17.8 g/cm | 195.6 g/cm |
| 17E | Paper coated with polymer/silicone | 12.7 g/cm | 838.2 g/cm |
| 17F | Paper coated with polymer/silicone | 28 g/cm | 68.6 g/cm |

As was the case for Example 16, these results show that the peel value for the syndiotactic polystyrene release liner is higher than those for some of the comparison specimens, but syndiotactic polystyrene release liner peel values are more stable over time. Syndiotactic polystyrene release liners also do not contaminate the adhesive as the other release liners tend to do. The syndiotactic polystyrene release liner has no coatings, and thus causes no contamination.

EXAMPLE 18

Polymerizing an adhesive is a process involving formation of polymer chains from monomers (short chain chemicals having low molecular weight). When polymerizing an adhesive on a silicone release liner by exposure to ionizing radiation, the release properties of the liner change. The changes range from a slight increase in peel values to situations in which the adhesive will not release from the liner. This is referred to as lock-up or pinning. Lock-up is caused by a chemical reaction, and is dependent on the type of adhesive and release liner. Syndiotactic polystyrene release liner properties do not change as much as commercial release liner properties when used for irradiation of adhesive.

To demonstrate this, a syndiotactic polystyrene release liner (Specimen 18A) was compared to a conventional release liner (Specimen 18B) of the type in which PET (polyethylene terephthalate) film is coated with a silicone-containing chemical (Film #632, Courtaulds Performance films, Martinsville, Va.). For each specimen, a mixture of 90 parts by weight isooctyl acrylate and 10 parts by weight acrylic acid was polymerized to about 15% conversion. This process, referred to as "syruping", is performed to thicken the adhesive so that the adhesive is easier to handle in coating operations. The syrup was coated onto the release liner to be tested at a thickness of about 51 $\mu$m (2 mils). The coating was irradiated with 4 Mrads (40 kGy) at 175 kV using the system of Example 16. After irradiation, a layer of PET film having no release coating was adhered to the upper, exposed, surface of the irradiated adhesive. The resultant assembly was conditioned at 70° F. (21° C.) and 50% RH for 24 hours. A 2.54 cm wide by 20.3 cm long strip was cut from the assembly. The layer of the strip comprising the PET film having no release coating was attached to the "3M Slip/Peel Tester" and the transducer was attached to the release liner layer in order to measure the force necessary to pull the release liner from the adhesive. The 180° peel value was measured at a peel rate of 90 in/min (229 cm/min). The average peel value was recorded. This procedure was repeated for another strip and the average of the two values was recorded.

For purposes of comparison, an additional specimen of each of the two release liners was prepared in which the adhesive was cured before being placed into contact with the release liner. To do this for each release liner specimen, the syrup was first placed onto a PET film having no release coating. The coated syrup was then irradiated from the top, exposed, side with 6 Mrads (40 kGy) at 175 kV. The release liner to be tested was then placed on top of the polymerized adhesive. The specimen was conditioned, cut and peel tested as in previous Examples. The results were as follows:

TABLE 5

| Specimen | 180° Peel at 229 cm/min (pre-polymerized) | 180° Peel at 229 cm/min (polymerized on the liner) |
|---|---|---|
| 18A | 99 g/cm | 414 g/cm |
| 18B (Comparison) | 28 g/cm | 2154 g/cm |

These results show that the syndiotactic polystyrene release liner exhibits a dramatically smaller change in peel properties after curing than the comparison release liner.

EXAMPLE 19

The procedure of Example 18 was followed to test release performance, after curing, of a release liner of the present invention against that of 5 comparison release liners, except that these specimens were irradiated at 6 Mrads (60 kGy), 175 kV. The commercially available release liners used in specimens 19B through 19F, respectively, were the same as the release liners used in Example 17 for specimens 17B through 17F, respectively. The results were as follows:

TABLE 6

| Specimen | Type | 180° Peel at 229 cm/min (pre-polymerized) | 180° Peel at 229 cm/min (polymerized on the liner) |
|---|---|---|---|
| 19A | Syndiotactic polystyrene | 91.4 g/cm | 218.4 g/cm |
| 19B | Silicone/clay impregnated paper | 10.2 g/cm | Lock up |
| 19C | PET film with silicone type coating | 17.8 g/cm | Lock up |
| 19D | Paper coated with polymer/silicone | 7.6 g/cm | Lock up |
| 19E | Paper coated with polymer/silicone | 12.7 g/cm | Lock up |
| 19F | Paper coated with polymer/silicone | 10.2 g/cm | Lock up |

In these tests, lock-up was judged to have occurred if the adhesive split during the peel test or if the adhesive and release liner would not separate. These results show that the release liner of the present invention provides much better release performance following curing than conventional release liners. Specifically, the silicone release liners tested locked up. It is believed that lock-up results because the silicone release materials chemically change during irradiation with electron beam radiation. Any silicone release liners that did release nonetheless would still tend to transfer silicone impurities to the adhesive and/or suffer from reduced release characteristics over time. In contrast, the syndiotactic polystyrene release liner does not have a silicone coating and free radicals are not easily formed in the film, which makes it stable to ionizing radiation. Syndiotactic polystyrene release liners of the present invention also have release characteristics that tend to be more stable over time.

COMPARATIVE EXAMPLE C1

This comparative example and the following two examples illustrate the thermal cure of a urethane acrylate IPN onto a series of three liners, untreated PET, sPS, and microreplicated sPS.

A urethane acrylate IPN formulation was prepared by mixing 4.28 g of a polyester polyol (Tone™ 0301, Union Carbide Corp.), 1.66 g propoxylated neopentyl glocol diacrylate (Sartomer™ SR9003, Sartomer Co., Inc., Exton, Pa.), 7.94 g isooctyl acrylate (IOA, 3M, St. Paul, Minn.), 2.49 g dimethyl acrylamide (Jarchem Industries, Inc., Newark, N.J.), 2.49 g isobomyl acrylate (IBA, Sartomer™ SR506, Sartomer Co., Inc., Exton, Pa.), 0.50 g Tinuvin™ 123 hindered amine light stabilizer (Ciba-Geigy Corp., Tarrytown, N.Y.), 0.38 g Uvinul™ 3039 UV stabilizer (BASF Crop., Mt. Olive, N.J.), and 0.06 g BYK-066™ flow control agent (BYK-Chemie, Wallingford, Conn.). Next a solution of 0.33 g di-(4-t-butylcyclohexyl) perxoydicarbonate thermal free-radical initiator (Perkadox™ 16, Akzo Nobel Chemicals Inc., Stratford, Conn.) in 2.0 g IOA was added with stirring, followed by addition of a solution of 0.0075 g dibutyl tin dilaurate (DBTDL, Aldrich Chemical Co., Milwaukee, Wis.) in 1.0 g caprolactone acrylate (Sartomer™ SR495, Sartomer Co., Inc., Exton, Pa.). The combined solution was mixed with a spatula, and then treated with 26.49 g of a polyfunctional aliphatic polyisocyanate (Airthane™ ASN-540, Air Products & Chemicals, Allentown, Pa.). The entire mixture was agitated with an air mixer for 1 minute and degassed under vacuum (500 mm Hg) for 1 minute. The degassed solution was knife coated between a 0.05 mm thick 15.2 cm wide untreated polyethylene terephthalate liner and a 15.2 cm wide silicone-coated PET release liner (0.10 mm thick, Courtaulds, Aerospace Inc., Glendale, Calif.) at a thickness of 6 mils (0.15 mm), and then cured with a temperature ramp from 90° C. to 120° C. (at a ramp rate of 1.5° C./min) and postcured at 90° C. for 17 hours.

EXAMPLE 20

The specimen was prepared as described in Comparative Example C1, except that an sPS liner (15.2 cm wide by 0.10 mm thick) was used in place of the 0.05 mm thick untreated PET liner.

EXAMPLE 21

The specimen was prepared as described in Comparative Example C1, except that a microreplicated sPS liner (15.2 cm wide by 0.10 mm thick) was used in place of the 0.05 mm thick untreated PET liner.

After the cure of the IPN was complete for each example (Comp. Ex. C1, and Exs. 20 and 21), the force required to remove a 1.27 cm strip of the IPN from the liner at a 90° peel angle was measured at 30.5 cm/min at 23° C. using an Instron Model 1122 with Series IX software (Instron Corp., Park Ridge, Ill.). This test was performed by adhering the uncoated side of the test liner to an aluminum panel, removing the silicone-coated PET release liner, cutting 1.27 cm strips through the IPN but not through to the test liner, and then pulling on these strips of IPN after clamping the aluminum panel into the peel tester. The results are presented in Table 7 as the average of at least four specimens.

COMPARATIVE EXAMPLE C2

This comparative example and the following example illustrate the thermal cure of an epoxy formulation onto each of two liners, untreated PET and sPS.

An epoxy formulation was prepared by combining 49.3 g of Epon™ 828 (Shell Chemicals, Houston, Tex.), 75.7 g Epon™ 1001 (Shell Chemicals, Houston, Tex.), 17.7 g ERL™ 4221 (Union Carbide, Danbury, Conn.), 98.9 g of Tone™ 0201 (Union Carbide, Danbury, Conn.), and 5.7 g of Tone™ 0301 (Union Carbide, Danbury, Conn.); with a solution of 2.5 g (mesitylene)$_2$Fe(SbF$_6$) (prepared according to the procedures outlined in Helling, J. F.; Rice, S. L.; Braitsch, D. M.; and Mayer, T.; *Journal of the Chemical Society (London), Section D, Chemical Communications*, 1971, No. 16, p 930; but preparing the SbF$_6$ species instead of the PF$_6$ species) dissolved in 5.0 g propylene carbonate (Aldrich Chemical Co., Milwaukee, Wis.). The solution was knife coated between a 15.2 cm wide, 0.05 mm thick, untreated polyethylene terephthalate liner, and a 7.6 cm wide, 22.9 cm long, 0.64 mm thick aluminum panel (Stock No. AL-39, Q-Panel Company, Cleveland, Ohio) which was supported by a 15.2 cm wide, 0.10 mm thick silicone-coated polyethylene terephthalate (PET) release liner (Courtaulds Aerospace, Inc., Glendale, Calif.); at a thickness of 6 mils (0.15 mm). The specimen was then cured at 140° C. for 30 minutes.

EXAMPLE 22

The specimen was prepared as described in Comparative Example C2, except that an sPS liner (15.2 cm wide by 0.10 mm thick) was used in place of the 0.05 mm thick untreated PET liner.

After the cure of the epoxy was complete for each example (Comp. Ex. C2 and Ex. 22), the force required to remove a 1.27 cm strip of the liner from the epoxy at a 90° peel angle was measured at 30.5 cm/min at 23° C. using an Instron Model 1122 with Series IX software (Instron Corp., Park Ridge, Ill.). This test was performed by removing the "supporting" silicone-coated PET release liner, cutting 1.27 cm strips through both the liner and the epoxy down to the aluminum and then clamping the aluminum.panel into the peel tester. The results are presented in Table 7 as the average of at least four specimens.

TABLE 7

| | 90° Peel Data | | |
|---|---|---|---|
| Example No. | Liner | Formulation | 90° Peel (g/cm) |
| C1* | Untreated PET | IPN | 383.9 |
| 20 | Regular sPS | IPN | 4.3 |
| 21 | Microreplicated sPS | IPN | 55.4 |
| C2* | Untreated PET | Epoxy | 1464.4 |
| 22 | Regular sPS | Epoxy | 82.1 |

*Comparative

As the results in TABLE 7 illustrate, sPS release liners, both regular and microreplicated, exhibit superior release properties toward IPN formulations as compared to untreated PET release liners, and regular sPS release liners exhibit superior release properties toward epoxy formulations as compared to untreated PET release liners.

The present invention should not be considered limited to the particular examples described above, but rather should be understood to cover all aspects of the invention as fairly set out in the attached claims. Other embodiments of this invention will be apparent to those skilled in the art, without departing from the true scope and spirit of the invention, upon consideration of this specification or from practices of the invention disclosed herein. Various modifications, omissions, equivalent processes, as well as numerous structures to which the present invention may be applicable will be readily apparent to those of skill in the art to which the present invention is directed upon review of the present specification. The claims are intended to cover such modifications and devices.

What is claimed is:

1. A method for producing an article having a patterned surface, comprising the steps of:
   providing a release liner having a patterned release surface thereon, said release surface comprising a syndiotactic vinyl aromatic polymer; and
   contacting the release surface with an impressionable mass such that the pattern on the release surface is imparted to the mass.

2. The method of claim 1, wherein the syndiotactic vinyl aromatic polymer is selected from the group consisting of polystyrene, polyalkylstyrenes, poly(halogenated styrene)s, poly(alkoxystyrene)s, and polyvinylbenzoate.

3. The method of claim 1, wherein the syndiotactic vinyl aromatic polymer comprises at least one polystyrene chain segment.

4. The method of claim 1, wherein the syndiotactic vinyl aromatic polymer is a copolymer derived from monomers comprising about 100 parts by weight of polystyrene and up to about 20 parts by weight of at least one monomer which is copolymerizable with polystyrene.

5. The method of claim 1, wherein the syndiotactic vinyl aromatic polymer is derived from a styrene-based monomer selected from the group consisting of styrene, alkylstyrenes, halogenated styrenes, alkoxystyrenes, or vinylbenzoate.

6. The method of claim 4, wherein the copolymerizable monomer is selected from the group consisting of alkylstyrenes, halogenated styrenes, alkoxystyrenes, vinylbenzoate, olefins, dienes, cyclic olefins, cyclic dienes, and polyvinyl monomers.

7. The method of claim 4, wherein the copolymerizable monomer is an alkylstyrene comprising a $(C_1-C_6)$alkyl moiety.

8. The method of claim 7, wherein the alkylstyrene is methylstyrene.

9. The method of claim 5, wherein the vinyl aromatic monomer is styrene.

10. The method of claim 1, wherein the impressionable mass is a molten polymer.

11. The method of claim 1, wherein the impressionable mass is a liquid which is curable into a solid mass.

12. The method of claim 11, wherein the liquid is cured into a solid mass while it is in contact with the patterned surface.

13. An article made in accordance with claim 12.

14. The method of claim 1, wherein the impressionable mass is a radiation curable composition, and wherein the curing step comprises irradiating the composition with an amount of radiation sufficient to effect the curing of the composition.

15. The method of claim 14, wherein the radiation is ultraviolet radiation.

16. The method of claim 1, wherein the impressionable mass is a radiation curable composition, and wherein the composition is cured by irradiating through the release liner.

17. The method of claim 1, wherein the article comprises an IPN.

18. The method of claim 17, wherein the IPN is a urethane acrylate IPN.

19. The method of claim 14, further comprising the step of irradiating the composition with an amount of radiation sufficient to effect the curing of the composition.

20. The method of claim 1, wherein the impressionable mass is an adhesive.

21. The method of claim 20, wherein the adhesive is a pressure sensitive adhesive.

22. An article, comprising:
   an article having an adhesive disposed thereon; and
   a release liner having a patterned release surface thereon, wherein said release surface comprises syndiotactic polystyrene and is in contact with said adhesive.

23. The article of claim 22, wherein said adhesive is a pressure sensitive adhesive.

24. The article of claim 22, wherein the article is a film.

25. A method for producing an article having a patterned surface, comprising the steps of:
   providing a release liner having a patterned surface, said patterned surface comprising a syndiotactic vinyl aromatic polymer; and
   contacting the patterned surface with an impressionable mass such that the pattern on the patterned surface is imparted to the mass.

26. The method of claim 25, wherein said syndiotactic vinyl aromatic polymer is syndiotactic polystyrene.

* * * * *

UNITED STATES PATENT AND TRADEMARK OFFICE
CERTIFICATE OF CORRECTION

PATENT NO. : 6,623,824 B1
APPLICATION NO. : 09/240521
DATED : September 23, 2003
INVENTOR(S) : Joseph, et al.

It is certified that error appears in the above-identified patent and that said Letters Patent is hereby corrected as shown below:

On title page (item 56)

Column 2 (Other Publications), Line 16, Below "1981.", insert- - Journal of the Chemical Society (London 1970) No. 16, P930, Helling et al. - -.

Column 2
Line 53-67, Delete "These and other ............(Plenum Press, New York, 1981)." and insert the same on line 53 after "IPNs."

Column 3
Line 1, After "unique" delete ".".

Column 5
Line 23 (Approx.), After "polymers" delete ".".

Line 36 (Approx.), After "them" delete ".".

Column 7
Line 41 (Approx.), Delete "$M_w$)" and insert - - ($M_w$) - -, therefore.

Column 8
Line 1, After "be" delete ".".

Line 50, Delete "meltirg" and insert - - melting - -, therefore.

Column 10
Line 35, After "greatly" delete "- ".

Column 14
Line 33 (Approx.), Delete "(1.00)" and insert - - (1.00g) - -, therefore.

Column 16
Line 11, After "liner" delete ".".

Line 32 (Approx.), After "time" delete ":" and insert - - . - -, therefore.

Column 19
Line 9, Delete "isobomyl" and insert - - isobornyl - -, therefore.

UNITED STATES PATENT AND TRADEMARK OFFICE
CERTIFICATE OF CORRECTION

PATENT NO. : 6,623,824 B1
APPLICATION NO. : 09/240521
DATED : September 23, 2003
INVENTOR(S) : Joseph et al.

It is certified that error appears in the above-identified patent and that said Letters Patent is hereby corrected as shown below:

Column 20
Line 36 (Approx.), After "aluminum" delete ".".

Column 22
Claim 14
Insert - - . - - following "the method of claim 1, wherein the impressionable mass is a radiation curable composition".

Delete "and wherein the curing step comprises irradiating the composition with an amount of radiation sufficient to effect the curing of the composition" after the ".".

Claim 16
Delete "wherein the impressionable mass is a radiation curable composition, and wherein the composition is cured".

Insert - -further comprising the step of curing the impressionable mass - - following "1".

Insert - - it - - following "irradiating".

Claim 17
Delete "article" following "the".

Insert "impressionable mass" following "the".

Signed and Sealed this

Twenty-second Day of August, 2006

JON W. DUDAS
*Director of the United States Patent and Trademark Office*